June 9, 1959      J. W. FITZLOFF      2,889,808
BREEDING BLANKET FOR TURKEYS
Filed July 24, 1957
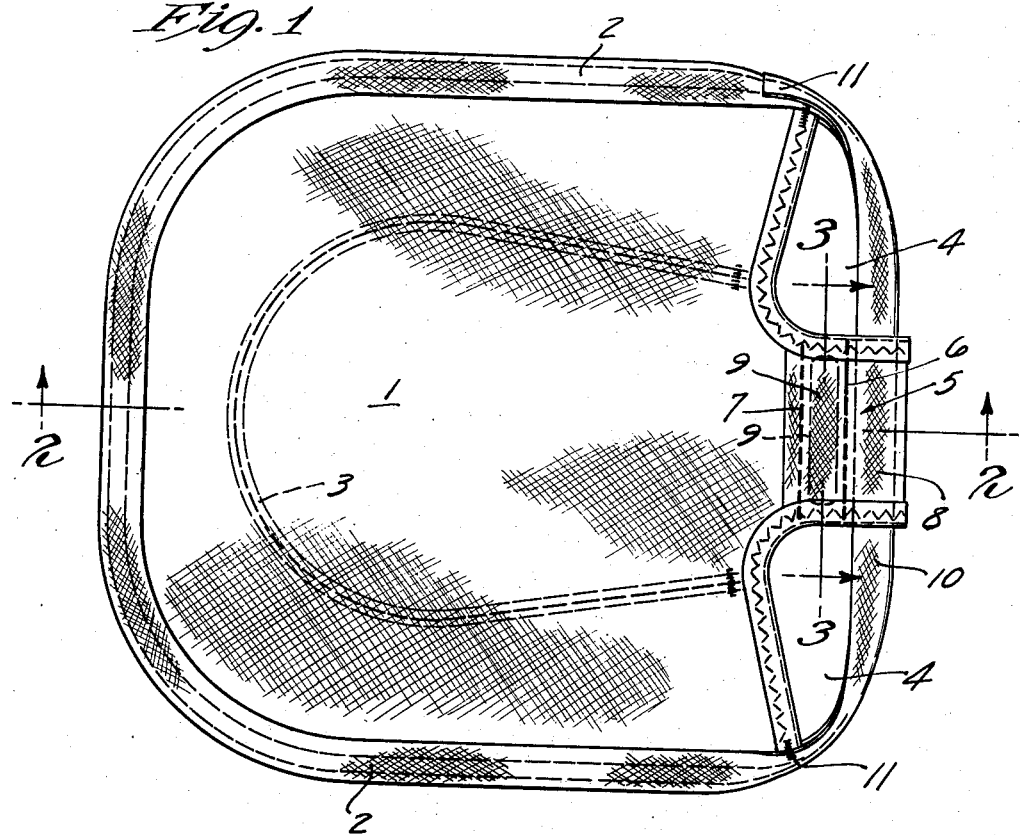
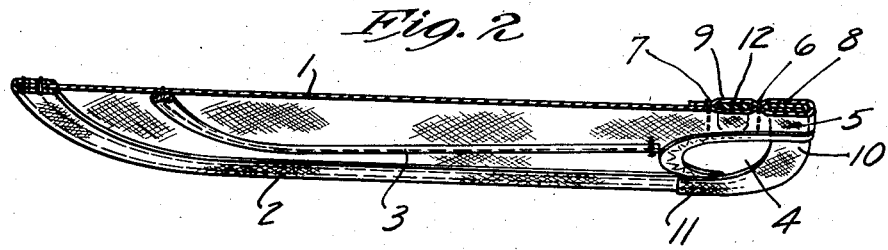
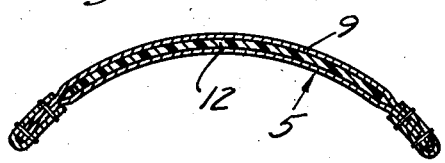
INVENTOR.
John W. Fitzloff
BY
Merchant & Merchant
ATTORNEYS

United States Patent Office 2,889,808
Patented June 9, 1959

2,889,808

BREEDING BLANKET FOR TURKEYS

John W. Fitzloff, St. Clair, Minn.

Application July 24, 1957, Serial No. 673,782

3 Claims. (Cl. 119—143)

My invention relates to improvements in breeding blankets for turkeys and is in the nature of an improvement upon Patent 2,293,895.

Blankets of the character above described are worn by the turkey hens during the mating season to protect the hens from injurious contact with the rooster during the mating act.

Structures of the type disclosed in Patent 2,293,895 include spaced wing hole notches at one end of the blanket, separated by a central tongue portion which is formed to provide a generally transversely extended sleeve at its outer end for the reception of a slip band which extends slidably through the sleeve with its opposite ends attached to the sides of the blankets at the opposite extremities of the respective wing hole forming notches. It is important that a slip band be freely slideable in the sleeve at all times so as to facilitate placing the same on and removing same from the wings of a turkey hen, and to assure automatic readjustment and freedom from binding after the wings of the turkey hen have been inserted in the wing hole notches. However, these blankets are subjected to all forms of weather and as a result thereof after the canvas like material from which they are formed becomes soft in use, it wrinkles up and takes on sort of accordion pleats which effectively shorten the sleeve and cause binding therebetween and the slip band. Not only is this shortening of the slip-band-receiving sleeve objectionable because it causes enlargement of the wing receiving notches (which permits a turkey that is sleeping with her head under her wing to get her head through the enlarged wing notch and cause strangulation) but also for the reason that when the slip band gets tightened in this manner, it frequently results in one wing receiving notch being effectively smaller than the other. Under such circumstances, the tight band on the small side has a wearing and scar forming effect on the skin of the turkey, which in turn has a devaluating effect thereon.

The object of my invention is the provision of an improved structure wherein a stiffening element is secured to the tongue portion of the blanket which extends between the wing receiving notches, said stiffening element being secured to said blanket in closely spaced parallel relation to the slip band receiving sleeve.

More specifically my invention provides a second closed-end sleeve immediately inwardly of the first mentioned sleeve and which is provided with a relatively rigid slat. With this arrangement, shrinking or puckering up of the slip-band-receiving sleeve, so as to objectionably increase the frictional engagement therebetween and the slip band, is totally limited.

A further object of my invention is the provision of a device of the class immediately above described which is inexpensive to produce, which is highly efficient in its operation, and which is rugged and durable.

The above and still further objects of my invention will become apparent from the following detailed specification, appended claims and attached drawings.

Referring to the drawings wherein like characters indicate like parts throughout the several views:

Fig. 1 is a view in top plan of my novel structure;

Fig. 2 is a view in section taken on the line 2—2 of Fig. 1; and

Fig. 3 is a fragmentary sectional view taken on the line 3—3 of Fig. 1.

Referring with greater particularity to the drawings, the numeral 1 indicates in its entirety a conventional turkey hen breeding blanket shown as being generally rectangular in form and bound about its marginal edges with a tape or the like 2. The blanket 1 and the tape 2 may be formed from any suitable flexible material such as canvas. An arcuate reinforcing rib, stitched thereto, is identified by the numeral 3.

Adjacent its forward end, the blanket 1 is formed to provide spaced wing receiving notches 4 which are separated by a central forwardly projecting tongue 5. At its forward end the tongue 5 is folded rearwardly upon itself and transversely stitched as at 6 and 7 to provide spaced parallel transversely extended sleeves 8 and 9 respectively. The sleeve 8 is open-ended for the slideable reception therein of a slip band 10, the opposite ends of which are secured to the sides of the blanket 1 at opposite extremities of the wing receiving notches 4, as indicated by the numeral 11. On the other hand, the sleeve 9 is closed at its opposite ends by stitching and the like so as to retain therein a reinforcing element in the nature of a relatively rigid slat 12. As shown, the slat 12 extends for substantially the entire length of the sleeve 9, and thus positively prevents the immediately adjacent slip-band-receiving notch 8 from becoming foreshortened by wrinkling and the like.

My invention has been thoroughly tested and found to be completely satisfactory for the accomplishment of the above objects and while I have shown a preferred embodiment thereof, it should be understood that same is capable of modification without departure from the scope and spirit of the appended claims.

What I claim is:

1. A breeding blanket of the kind described made of flexible material formed adjacent one end with laterally spaced wing receiving notches separated by a central tongue portion, said tongue portion being formed to provide a generally transversely extending sleeve, said sleeve having two parallel portions, a slip band slidable through a first of said sleeve portions with its opposite ends attached to the sides of the blanket at the opposite extremities of the respective wing forming notches, and a stiffening means secured in the second sleeve portion, whereby the stiffened second sleeve portion will maintain said first sleeve portion in relatively straight condition insuring free sliding movement of said slip band therethrough.

2. The structure of claim 1 in which said tongue portion is backturned upon itself and stitched transversely thereof along parallel spaced lines to provide said first and second sleeve portions.

3. The structure of claim 2 in which said stiffening means comprises a relatively rigid slat.

References Cited in the file of this patent

UNITED STATES PATENTS

| | | |
|---|---|---|
| 2,293,895 | Fitzloff | Aug. 25, 1942 |
| 2,553,864 | Neely | May 22, 1951 |